United States Patent [19]

Solden

[11] 4,065,087
[45] Dec. 27, 1977

[54] MOUNTABLE ATTACHMENT

[75] Inventor: LeRoy Solden, St. Peter, Minn.

[73] Assignee: Widen Tool & Stamping, Inc., St. Peter, Minn.

[21] Appl. No.: 705,414

[22] Filed: July 15, 1976

[51] Int. Cl.$^2$ .............................................. A47B 96/06
[52] U.S. Cl. ............................ 248/201; 248/316 A; 248/316 C; 248/310
[58] Field of Search ............... 248/201, 203, 298, 309, 248/310, 316 R, 316 A, 316 C, 226 R, 226.1, 226.3; 24/201 HE, 201 A, 230 BC

[56] References Cited

U.S. PATENT DOCUMENTS

| | | | |
|---|---|---|---|
| 1,002,759 | 9/1911 | Rindge | 248/316 A |
| 1,377,160 | 5/1921 | Tiikkainen | 248/310 |
| 2,501,176 | 3/1950 | Jacobs | 248/316 A |
| 2,566,656 | 9/1951 | David | 248/298 |
| 2,713,471 | 7/1955 | Hirsch | 248/310 |
| 2,911,700 | 11/1959 | Wieland | 248/310 |
| 3,822,049 | 7/1974 | Saunders | 248/203 |
| 3,965,705 | 6/1976 | Nadler | 248/203 |
| 3,994,148 | 11/1976 | Anderson | 248/203 |

Primary Examiner—Robert A. Hafer
Attorney, Agent, or Firm—James R. Cwayna

[57] ABSTRACT

A mountable, attachment unit which includes a first plate member adapted to be anchored or positively mounted to a dashboard or suitable surface of a vehicle or the like having a first, permanently arranged capturing lip thereon to receive and hold one portion of a mounting bracket of an accessory unit such as a CB radio or the like therein and a second, spring loaded lip element, slideable and in reverse position to the permanent lip to capture an opposite side of the bracket of the unit to be mounted therein with the spring pressure between such lips provided to positively hold the accessory unit between the permanent and movable lip portions.

5 Claims, 8 Drawing Figures

U.S. Patent  Dec. 27, 1977  Sheet 1 of 2  4,065,087
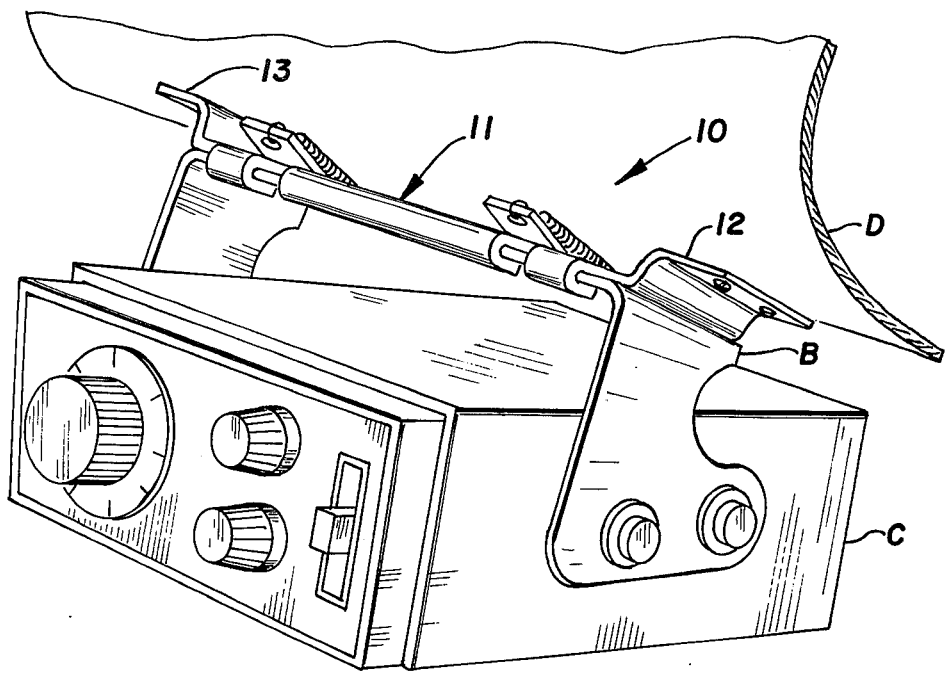
FIG.1
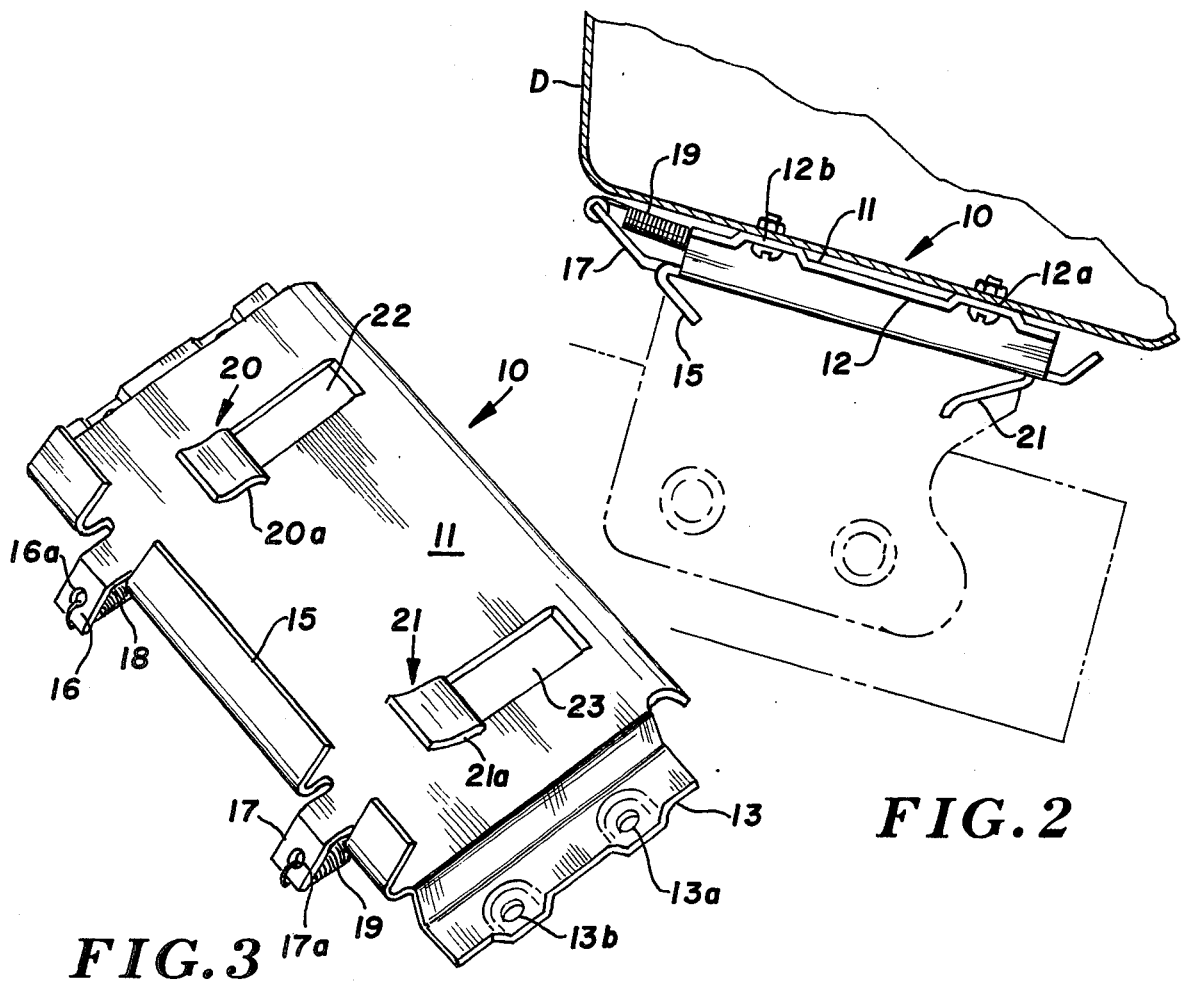
FIG.2
FIG.3

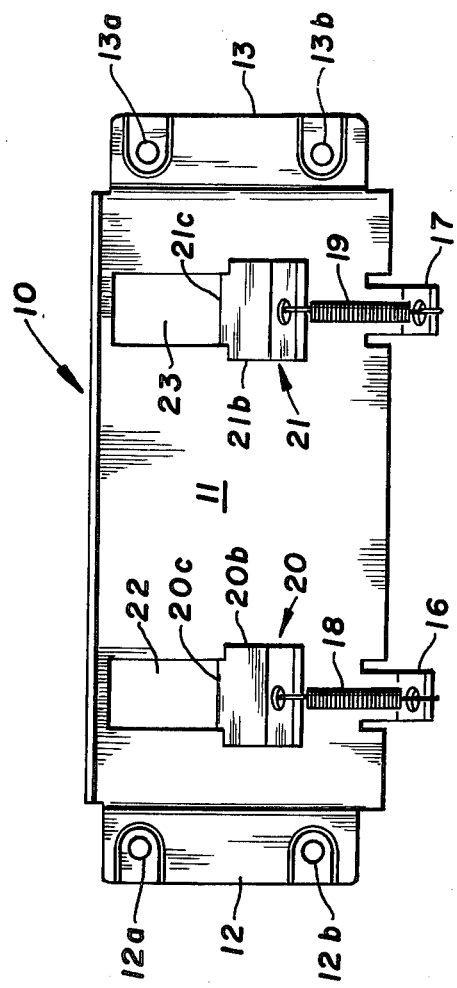
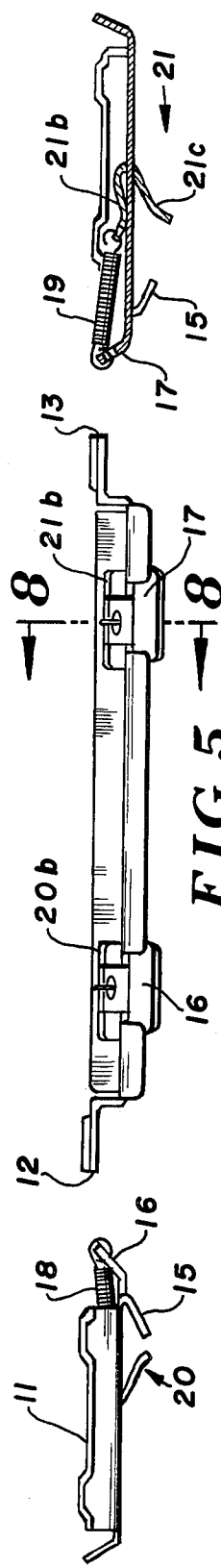
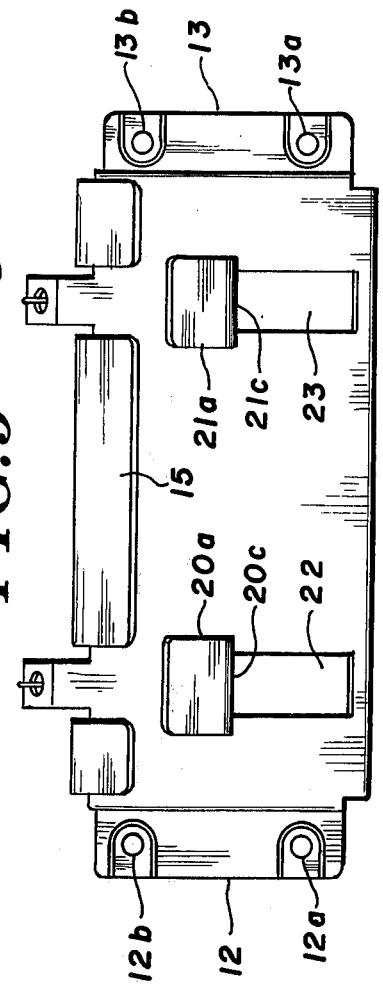

MOUNTABLE ATTACHMENT

FIELD OF THE INVENTION

This invention relates generally to mounting brackets and more particularly to mounting brackets arranged for permanent installation in vehicles or the like with quick release means associated therewith for releasably holding accessory units or the like thereto.

BACKGROUND AND OBJECTS OF THE INVENTION

Many vehicles are presently being equipped with accessory equipment such as cassette players, eight-track players, CB radios and the like. A very serious problem with such installations is that of theft. In such installations, such accessory units are relatively easily removable from the vehicles and such losses have greatly increased insurance premiums for vehicles which profess to include such accessory units.

It is applicant's concept to provide a quick release mounting attachment to receive such accessory units which permit the unit to be positively held in the vehicle for proper operation thereof but which permits removal of the accessory unit without requiring any tools for the release of the same.

With applicant's device, a spring loaded mounting device is provided wherein a first permanent lip is provided to engage a portion of the accessory unit to be inserted into the vehicle and a second lip is provided, which second lip is spring loaded in reverse position to the first permanent lip to engage a second portion of the accessory unit and entrap the same therebetween.

With applicant's device, the flexibility of and the sliding arrangement of the two lip retaining elements provides an adapter and mounting attachment which will receive and hold a wide variety of various sized elements without requiring any mechanical adjustment of the device.

It is therefore an object of applicant's invention to provide a mountable attachment device for the mounting of accessory units to vehicles and the like which device provides a positive holding force for the units for proper operation thereof and which further permits ease of removal of the units therefrom.

It is a further object of applicant's invention to provide a mountable attachment device particularly designed for the placement of accessory units such as tape players, CB radios and the like into automobiles or other vehicles by providing a dashboard mounting plate having a releasable spring loaded grasping arrangement to hold selected portions of the accessory installed in association therewith.

It is still a further object of applicant's invention to provide a dashboard or other surface mounting device for the mounting of various accessories into automobiles and other vehicles which includes a plate member positively positionable upon the dashboard or other selected area of the vehicle with spring loaded retaining elements arranged thereon to grasp and secure selected portions of the accessory placed therein such that the accessory may be easily inserted into the device and easily removed therefrom without requiring removal of the positionable plate member.

It is still a further object of applicant's invention to provide a universal mounting attachment device for use in vehicles and the like for the mounting of accessory elements, which mounting device is designed to receive a variety of elements without requiring any positive resizing of the same for the placement of such elements therein.

These and other objects and advantages of applicant's invention will more fully appear from the accompanying disclosure made in connection with the accompanying drawings in which the same numerals or designations are utilized to designate the same or similar parts or elements throughout the several views, and in which:

FIG. 1 is a perspective view of a portion of a vehicle dashboard having the mountable attachment device of applicant's device and invention illustrated attached thereto and further illustrating an accessory element such as a CB radio retained therein;

FIG. 2 is a side elevation taken from FIG. 1;

FIG. 3 is a perspective view of the attachment element embodying the concepts of applicant's invention illustrated from the lower or bottom accessory receiving side thereof;

FIG. 4 is a top plan view of the mountable attachment element;

FIG. 5 is a view from the forward or frontal edge thereof;

FIG. 6 is a bottom plan view thereof;

FIG. 7 is a view taken from one end thereof; and,

FIG. 8 is a horizontal section taken substantially along Line 8—8 of FIG. 7.

In accordance with the accompanying drawings, applicant's attachment member is generally designated 10 and is illustrated in FIGS. 1 and 2 as being mounted upon the dashboard D of a vehicle with an accessory unit such as a CB radio C mounted therein. Normally, a CB radio or similar such other accessory is supplied with a mounting bracket B which is of a predetermined length and width to normally permit the same to be installed upon the dash-board or other such surface of a vehicle. The problem with such permanent installations is, as previously discussed, the theft situation. It is possible to remove units mounted in such a manner and users of accessories are desirable of mountings which will permit them to the same whenever the vehicle will be left unattended. In considering this invention, the sizing of the mounting device 10 provides means for receiving various sized brackets to properly hold the accessory during operation and to permit its removal at the users desire.

To accomodate these considerations, the mounting attachment 10 includes a first plate member 11, longitudinally extending and having a pair of angularly offset and parallely arranged attachment flanges 12, 13 on the longitudinal ends thereof with apertures 12a, 12b, 13a, 13b formed therein such that attachment elements such as nuts, bolts, screws or the like may pass therethrough and be received into the dashboard D of the automobile. The parallel offset of the attachment flanges 12, 13 then permit the main plate 11 to be disposed from the dashboard or the surface upon which the unit is mounted such that the spring loaded portions of the unit may operate and be positioned between the plate 11 and the dashboard D. As illustrated in FIG. 3 and the Figures following the same, the plate 11 is provided with a first lip portion 15 formed along one longitudinal edge thereof which lip provides a first entrapping area between the inner surface of the lip 15 and the surface of the plate 11 such that one longitudinal edge of the bracket B will be received therein and held against the lip element 15. As illustrated in the various views, this lip is not shown to be continuous as a pair of spring retaining tabs 16, 17 are formed along this same longitudinal edge of plate 11 and are formed in reverse direction to lip 15 and angularly to the opposite side of plate 11 and are provided with apertures 16a, 17a therein to receive one end of actuating springs 18, 19 therein for control of a movable retaining lip member 20, 21 which is in reversed and cooperating position to the direction of the first capturing, permanent lip 15.

The movable lip or retaining elements 20, 21 are held for transverse sliding movement across plate 11 by providing a pair of substantially rectangular slots 22, 23 in the plate 11 to extend transversely thereacross in alignment with the aforementioned tabs or spring retaining elements 16, 17 such that the springs 18, 19 will act upon the movable lip elements 20, 21 and normally urge the same inwardly or towards the permanent flange 15.

Each of the movable lip elements 20, 21 includes an upper and lower surface with the upper surfaces being designated 20a, 21a and the lower surfaces being designated 20b, 21b which surfaces are joined with a connecting portion 20c, 21c which connecting portion is of a size to be received in the rectangular plate slots 22, 23 with the sizing therebetween permitting sliding movement of the lip elements 20, 21. This particular arrangement then provides a structure as substantially illustrated in FIG. 8, wherein the springs 18, 19 are respectively connected to the bottom surfaces 20b, 21b of the lip elements 20, 21 such that the entire unit is urged towards the extending permanent lip 15. It should be noted that the upper and lower surfaces of the movable lip members are angularly arranged with respect to one another such that the receiving upper portion and the lower portion are commonly directed.

A concept of applicant's device then, provides a pair of lip or retaining elements, one of which is permanently attached or permanently arranged with the other thereof being slidably arranged in relation thereto such that a normal biasing force is maintained to bring the lips together. Obviously, an article placed between these lips will be captured therebetween and due to the construction of the lips, providing an angular surface with respect to the base plate 11, the unit will not only be captured between the lips but will be urged against the plate 11 due to the angularity of the lips. This arrangement will provide a positive mounting for the various units which do not operate well in what may be termed vibratory conditions.

With applicant's device, it is only necessary to attach the main plate 11 to a supporting surface through the connecting flanges 12, 13 and the apertures therethrough and thereafter, the exertion of a spreading force to the lips 20, 21 will enlarge the receiving area to permit the insertion of accessory units. When the accessory unit is positioned therein, the normal force urging the lips 20, 21 together will retain the unit in a positive position and the release thereof is easily accomplished by reversing such procedure. The moveable lips, being retained in the rectangular tracks, provide for proper alignment between themselves and the permanent lip 15 but the design thereof, particularly the use of a plurality of such lips permits accomodation of mounting brackets of a variety of shapes.

It should be obvious that applicant has supplied a unique mounting device for the mounting of accessory units into vehicles and the like which permits the insertion and mounting of the accessory unit into and onto the vehicle without requiring any positive type attachment elements but which still provides a positive and stable mounting for the same when the accessory is placed therein.

What I claim is:

1. A mountable attachment device for mounting accessory items in vehicles and the like, such device including:
    a. a first plate member, generally rectangular in shape and including an upstanding lip member along at least a portion of one of the longitudinal sides of said plate to provide a first article retaining element, said lip member being angularly directed to overlie said plate;
    b. means for attaching said plate member to a supporting surface;
    c. track means including at least a pair of spaced passages through said plate and being arranged transversely with respect to said first article retaining element
    d. second article retaining means being arranged in said track means including at least a pair of lip members which lip members are angularly directed to overlie said plate and being directed towards said first retaining element; and,
    e. biasing means associated with said second article retaining means for normally biasing the same towards said first article retaining element for holding articles therebetween.

2. The structure set forth in claim 1 and said second article retaining means including two independently operable lip members and biasing means being provided for each of said members.

3. The structure set forth in claim 2 and said second article retaining means including said lip member being arranged on one side of said plate and an attachment end arranged on the other side of said plate, said biasing means being attached to said attachment ends.

4. The structure set forth in claim 3 and at least one biasing means retaining tab being formed adjacent said first article retaining element and directed in opposed relation thereto whereby said biasing means is positioned on one side of said plate, said retaining elements extending upwardly from the other side of said plate.

5. The structure set forth in claim 1 and a pair of attachment flanges provided on the longitudinal ends of said plate member, said flanges being parallely offset from said plate member.

* * * * *